US006788837B2

(12) United States Patent
Liu et al.

(10) Patent No.: US 6,788,837 B2
(45) Date of Patent: Sep. 7, 2004

(54) METHOD AND APPARATUS FOR INTERLEAVING AND SWITCHING AN OPTICAL BEAM IN A SEMICONDUCTOR SUBSTRATE

(75) Inventors: Ansheng Liu, Cupertino, CA (US); Mario J. Paniccia, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 09/819,520

(22) Filed: Mar. 27, 2001

(65) Prior Publication Data
US 2004/0120634 A1 Jun. 24, 2004

(51) Int. Cl.$^7$ ................................................ G02B 6/26
(52) U.S. Cl. ............................ 385/15; 385/24; 385/46; 385/16; 385/45; 385/131; 385/37
(58) Field of Search ............................. 385/24, 27, 37, 385/39, 130, 131, 132, 15–17, 46

(56) References Cited

U.S. PATENT DOCUMENTS

| 5,862,279 | A | * | 1/1999 | Amersfoort et al. | 385/40 |
|---|---|---|---|---|---|
| 5,862,288 | A | * | 1/1999 | Tayag et al. | 385/129 |
| 5,933,554 | A | * | 8/1999 | Leuthold et al. | 385/28 |
| 6,084,992 | A | * | 7/2000 | Weber et al. | 385/24 |
| 6,144,779 | A | | 11/2000 | Binkley et al. | |
| 6,222,955 | B1 | * | 4/2001 | Lagali et al. | 385/20 |
| 6,253,000 | B1 | * | 6/2001 | Madsen et al. | 385/16 |
| 6,292,597 | B1 | | 9/2001 | Lagali et al. | |
| 6,374,013 | B1 | * | 4/2002 | Whiteaway et al. | 385/37 |
| 6,456,754 | B1 | * | 9/2002 | Augustsson | 385/24 |
| 6,603,893 | B1 | | 8/2003 | Liu et al. | |
| 2001/0022878 | A1 | * | 9/2001 | Saida et al. | 385/27 |
| 2002/0159686 | A1 | * | 10/2002 | Madsen | 385/24 |

OTHER PUBLICATIONS

Bachmann, M., "General self–imaging properties in N × N multimode interference couplers including phase relations", *Applied Optics*, vol. 33, No. 18, pp. 3905–3911, Jun. 20, 1994.
Smit, M.K., "PHASAR–Based WDM–Devices: Principles, Design and Applications", *IEEE Journal of Selected Topics in a Quantum Electronics*, vol. 2, No. 2, pp. 236–250, Jun. 1996.
Soldano L.B., "Optical Multi–Mode Interference Devices Based on Self–Imaging: Principles and Applications", *Journal of Lightwave Technology*, vol. 13, No. 4, pp. 615–627, Apr. 1995.

(List continued on next page.)

Primary Examiner—Hemang Sanghavi
(74) Attorney, Agent, or Firm—Blakely, Sokoloff, Taylor & Zafman LLP (57) ABSTRACT

An optical interleaving switching method and apparatus. In one aspect of the present invention, the disclosed apparatus includes first and second multi-mode interference (MMI) coupling devices disposed in a semiconductor substrate. Each of the first and second MMI coupling devices include first and second inputs and first and second outputs. A first optical coupler having a first optical path length is included. The first output of the first MMI coupling device is optically coupled to the first input of the second MMI coupling device through the first optical coupler. A second optical coupler having a second optical path length is also included. The second output of the first MMI coupling device is optically coupled to the second input of the second MMI coupling device through the second optical coupler. The first optical path length of the first optical coupler is different than the second optical path length of the second optical coupler. In another aspect of the invention, a 2×2 optical switch is optically coupled to the inputs and/or outputs of the first and/or second MMI coupling devices providing multiplexing/demultiplexing and switching functionality for multi-channel optical input and/or output beams.

5 Claims, 6 Drawing Sheets

OTHER PUBLICATIONS

Kareenahalli, S., "Experimental Confirmation of Phase Relationships of Multimode Interference Splitters Using a Shearing–Type Near–Field Sagnac Interferometer", *IEEE Photonics Technology Letters*, vol. 9, No. 7., pp. 937–939, Jul. 1997.

Rasmussen, T., "Design and Performance Evaluation of 1–by–64 Multimode Interference Power Splitter for Optical Communications", *Journal of Lightwave Technology*, vol. 13, No. 10., pp. 2069–2074, Oct. 1995.

Rajarajan, M., "Accurate Analysis of MMI Devices with Two–Dimensional Confinement", *Journal of Lightwave Technology*, vol. 14, No. 9, Sep. 1996.

Lorenzo, R.M., "Improved self–imaging characteristics in 1×N multimode couplers", *IEE Proc.–Optoelectron.*, vol. 145, No. 1, Feb. 1998.

* cited by examiner

METHOD AND APPARATUS FOR INTERLEAVING AND SWITCHING AN OPTICAL BEAM IN A SEMICONDUCTOR SUBSTRATE

BACKGROUND OF THE INVENTION

1. Field of the Invention

The present invention relates generally to multiplexing/demultiplexing and switching signals and, more specifically, the present invention relates to multiplexing/demultiplexing and switching optical signals.

2. Background Information

The need for fast and efficient optical switches, multiplexors/demultiplexors, and other similar types of optical devices is increasing as Internet data traffic growth rate is overtaking voice traffic pushing the need for optical communications. Commonly used multiplexors/demultiplexors include diffraction gratings, thin-film filters, fiber Bragg gratings, and arrayed-waveguide gratings. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent, material that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Methods and apparatuses for switching optical beams in a semiconductor substrate are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, a semiconductor-based optical interleaver is provided in a fully integrated solution on a single integrated circuit chip. Various embodiments of the optical interleaver in accordance with the teachings of the present invention include an optical splitter disposed in a semiconductor substrate at least one input and two outputs. Accordingly, an optical beam received at one of the inputs of the optical splitter is split into two beams with substantially equal amplitude and almost $\pi/2$ phase shift. Conversely, two optical beams received at the outputs of the splitter with $\pi/2$ phase difference are output as a combined beam from the input of the optical splitter. In one embodiment, this optical splitter includes a multi-mode interference (MMI) coupling device including two inputs and two outputs. When this MMI coupling device is used as an optical splitter, one of the two inputs of the MMI coupling device is coupled to receive the optical beam and the split optical beams are output from the two outputs of the MMI coupling device.

In one embodiment, the two split beams output from the outputs of the above-described optical splitter are coupled to two inputs of another MMI coupling device through an unbalanced pair of optical couplers. In one embodiment, the unbalanced pair of optical couplers includes two waveguides in the semiconductor substrate having different optical path lengths. The MMI coupling device receiving the split optical beams through the unbalanced pair of optical couplers includes two outputs. In one embodiment, the two outputs of this MMI coupling device output optical beams dependent on the wavelength or frequency components of the optical beams. Accordingly, an optical beam having one wavelength or subset of wavelengths is output from one of the outputs of the MM coupling device in accordance with the teachings of the present invention. Another optical beam having a different wavelength or a different subset of wavelengths is output from the other output of the MMI coupling device in accordance with the teachings of the present invention.

In one embodiment, it is appreciated that optical beams may propagate in either direction through the above-described optical interleaver. Accordingly, an optical interleaver in accordance with the teachings of the present invention may function as a multi-channel optical multiplexor and/or an optical demultiplexor. In addition, a plurality of optical interleavers in accordance with the teachings of the present invention may be cascaded or stacked together to provide multiplexors or demultiplexors with various configurations having multiple inputs or outputs. In one embodiment, optical switches may be optically coupled to the inputs and/or outputs of an interleaver to selectively switch or couple optical beams having different wavelengths to different optical ports in accordance with the teachings of the present invention. Embodiments of the disclosed optical interleaving and switching devices can be used in a variety of high bandwidth applications including multi-processor, telecommunications, networking or the like. In addition, embodiments of the disclosed optical interleaving devices may be used for reconfigurable add/drop systems.

Figure 1:
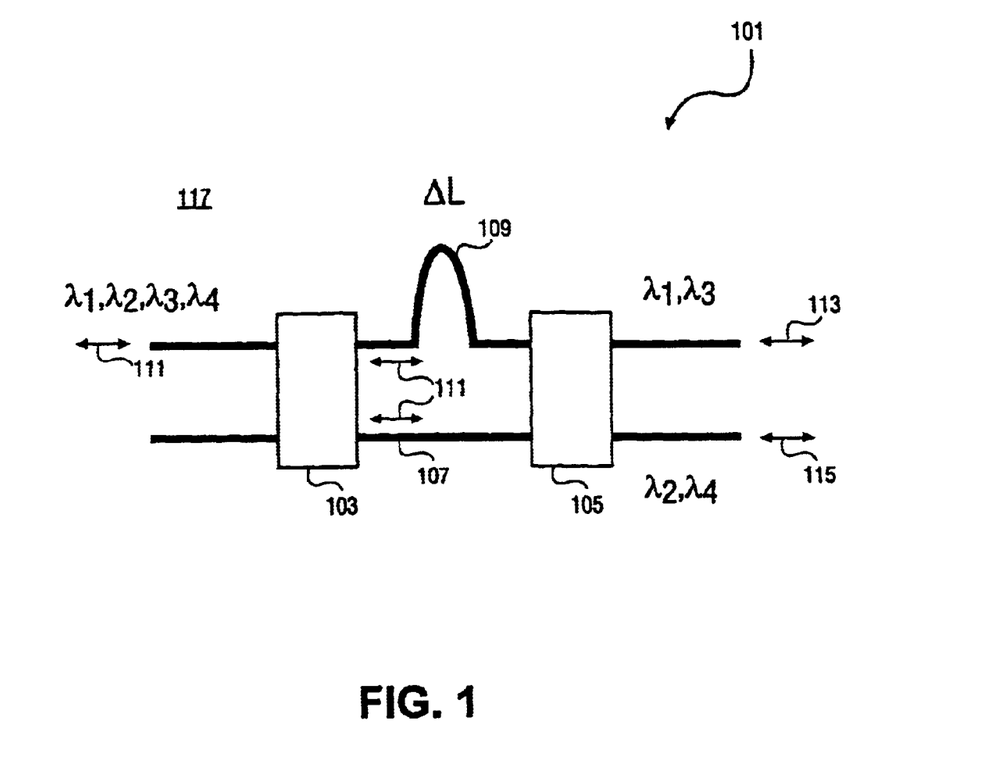
FIG. 1 is a block diagram illustrating one embodiment of an optical interleaver in accordance with the teachings of the present invention.

To illustrate, FIG. 1 is a block diagram illustrating one embodiment of an optical interleaver 101 disposed in a semiconductor substrate 117 in accordance with the teachings of the present invention In one embodiment, semiconductor substrate 117 includes silicon, a III-V semiconductor material or the like. As shown in the depicted embodiment, an optical splitter 103 is optically coupled to receive an optical beam 111 at an input of the optical splitter 103. In one embodiment, optical beam 111 is a multichannel optical beam carrying a plurality of channels, each of which having different wavelengths such as for example $\lambda_1, \lambda_2, \lambda_3$ and $\lambda_4$. It is noted that four wavelengths $\lambda_1, \lambda_2, \lambda_3$ and $\lambda_4$ are shown in FIG. 1 for explanation purposes. It is appreciated that optical beam 111 may include a greater or fewer number of wavelengths in accordance with the teachings of the present invention. In one embodiment, the multiple wavelengths included in optical beam 111 correspond to infrared or near-infrared wavelengths. In one embodiment, the multiple wavelengths included in optical beam 111 correspond to substantially equal frequency-spaced (e.g. 100 GHz) signals having wavelengths approximately equal to 1.3 $\mu$m or 1.55 $\mu$m or the like.

As shown in the depicted embodiment, optical splitter 103 includes two outputs from which split versions of optical beam 111 are output in one embodiment, optical splitter 103 is a multi-mode interference (MMI) coupling device having two inputs and two outputs. In the embodiment depicted in FIG. 1, one of the two inputs of the MMI coupling device used to form optical splitter 103 is coupled to receive optical beam 111. It is appreciated that although the terms "input" and "output" have been used herein for explanation purposes the direction of propagation of the optical beam 111 may be reversed in accordance with the teachings of the present invention. Accordingly, in an embodiment in which optical beam 111 is propagating in the opposite direction, optical beam 111 is generated at the input of optical splitter 103.

As shown in FIG. 1, one embodiment of optical interleaver 101 also includes an MMI coupling device 105 disposed in semiconductor substrate 117 and having two inputs and two outputs. The two inputs of MMI coupling device 105 are optically coupled to receive the two split versions of optical beam 111 through an unbalanced pair of optical couplers 107 and 109. In one embodiment, optical couplers are optical waveguides disposed in semiconductor substrate 117 having different optical path lengths. In one embodiment, the optical waveguides used to form optical couplers 107 and 109 are formed with silicon waveguides with oxide cladding disposed in semiconductor substrate 117. In one embodiment, the optical waveguides used to form optical couplers 107 and 109 include rib waveguides disposed in a silicon on insulator (SOI) wafer. As shown in FIG. 1, the optical path lengths of optical couplers 107 and 109 differ by $\Delta L$ in one embodiment In one embodiment, since optical couplers 107 and 109 have optical path lengths that differ by $\Delta L$, the outputs from MMI coupling device 105 show an interference pattern in the optical frequency domain and the output spectrum at one of the outputs of MMI coupling device 105 is described by the following equation:

$$I_1(v)=I_1(v)\cos^2(vn\Delta L\pi/c) \quad \text{(Equation 1)}$$

where v is the optical frequency, n is the effective index of refraction of the guided mode in the optical coupler and c is the speed of light in a vacuum. The output spectrum at the other output of MMI coupling device 105 is given by:

$$I_2(v)=I_1(v)\sin^2(vn\Delta L\pi/c). \quad \text{(Equation 2)}$$

Thus, when multi-channel optical beam such as optical beam 111, which in the illustrated example includes wavelengths $\lambda_1, \lambda_2, \ldots \lambda_N$ is coupled into the input of optical splitter 103, the two outputs of MMI coupling device 105 have wavelength components of $\lambda_1, \lambda_3, \ldots \lambda_{n-1}$ and $\lambda_2, \lambda_4, \ldots \lambda_n$, respectively, as shown in FIG. 1. The channel spacing, $\Delta v$, is related to the optical path difference $\Delta L$ by $$\Delta v=c/(2n\Delta L). \quad \text{(Equation 3)}$$

In an example embodiment for a 100 GHz optical interleaver 101, the optical path difference $\Delta L$ is about 435 $\mu$m between optical couplers 107 and 109. It is appreciated that the channel spacing of the interleaver is also determined by the effective index of the waveguide mode. Therefore, changing the waveguide dimension as well as the temperature leads to a change in the channel spacing.

In one embodiment, optical interleaver 101 is used to separate one set substantially equal frequency-spaced (e.g. 100 GHz) signals of a multi-channel optical signal into two subsets of signals with double frequency-spacing (e.g. 200 GHz) between the channels. As also shown in the embodiment depicted in FIG. 1, light may also propagate in the opposite direction such that optical interleaver 101 multiplexes or combines the double frequency-spaced channels received at the two outputs of MMI coupling device 105 into an equal frequency-spaced multi-channel signal, which is output from the input of optical splitter 103.

Figure 2:
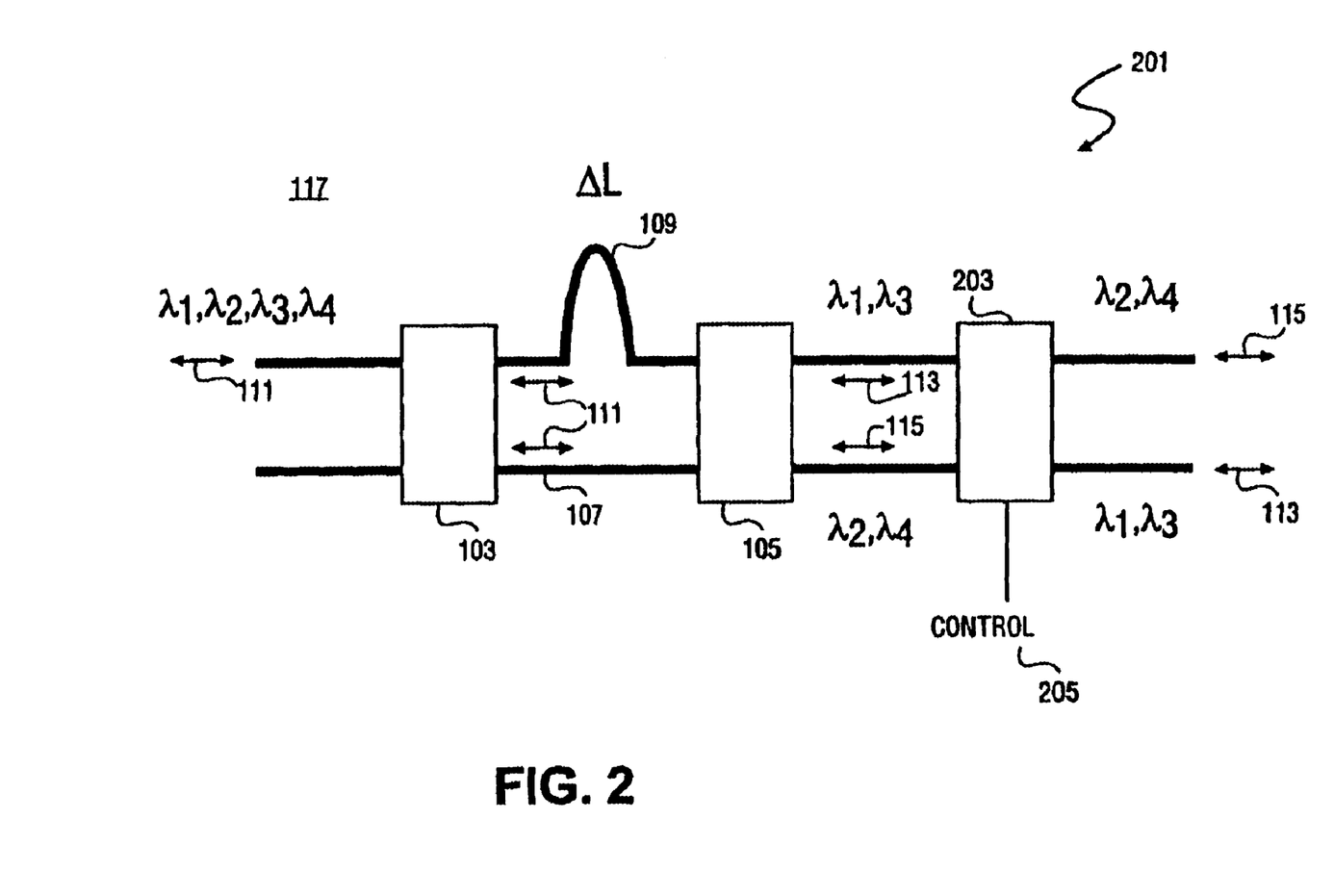
FIG. 2 is a block diagram illustrating another embodiment of an optical interleaver including switching capability in accordance with the teachings of the present invention.

FIG. 2 is an illustration of another embodiment of an optical interleaver 201 including switching capability in accordance with the teachings of the present invention. As shown in the illustrated embodiment, optical interleaver 201 is similar to optical interleaver 101 as an optical splitter 103 is included to split a multi-channel equal frequency-spaced optical beam 111 into two split beams. The split beams of optical beam 111 are optically coupled to be received by an MMI coupling device 105 through an unbalanced pair of optical couplers 107 and 109 such that optical beams 113 and 115 are output from the two outputs of MMI coupling device 105.

As shown in the embodiment depicted in FIG. 2, an optical switch 203 disposed in semiconductor substrate 117 is also included in interleaver 201. In one embodiment, optical switch 203 is an N×N optical such as for example a 2×2 optical switch having two inputs and two outputs. In one embodiment, each of the two outputs of optical switch 203 is selectively optically coupled to either of the two inputs of optical switch 203 in response to a control signal 205. In operation, the first input of optical switch 203 may be selectively optically coupled to the first output or the second output of optical switch 203. Similarly, the second input of optical switch 203 may be selectively optically coupled to the first output or the second output of optical switch 203. Accordingly, channels of optical beam 111 can be switched to individual output ports with optical switch 203 in accordance with the teachings of the present invention.

Thus, in the example embodiment illustrated in FIG. 2, optical beam 115 including wavelengths $\lambda_2$ and $\lambda_4$ is output at a first one of the outputs of optical switch 203 and optical beam 113 including wavelengths $\lambda_1$ and $\lambda_3$ is output at a second one of the outputs of optical switch 203 in response to control signal 205. It is appreciated that control signal 205 can be used to switch the outputs of optical switch 203 such that optical beam 115 is output at the second one of the outputs of optical switch 203 and optical beam 113 is output at the first one of the outputs of optical switch 203.

It another embodiment, it is appreciated that optical switch 203 may be optically coupled to the inputs of optical splitter 103. In such an embodiment, an MMI coupling device having two inputs and two outputs, similar to for example MMI coupling device 105 may be utilized as optical splitter 103.

It is noted that various embodiments of optical switches that may be employed as optical switch 203 are described in co-pending application Ser. No. 09/819,160, filed Mar. 27, 2001, U.S. Pat. No 6,603,893 entitled "Method and Apparatus for Switching an Optical Beam in a Semiconductor Substrate," and assigned to the Assignee of the present application.

Figure 3:
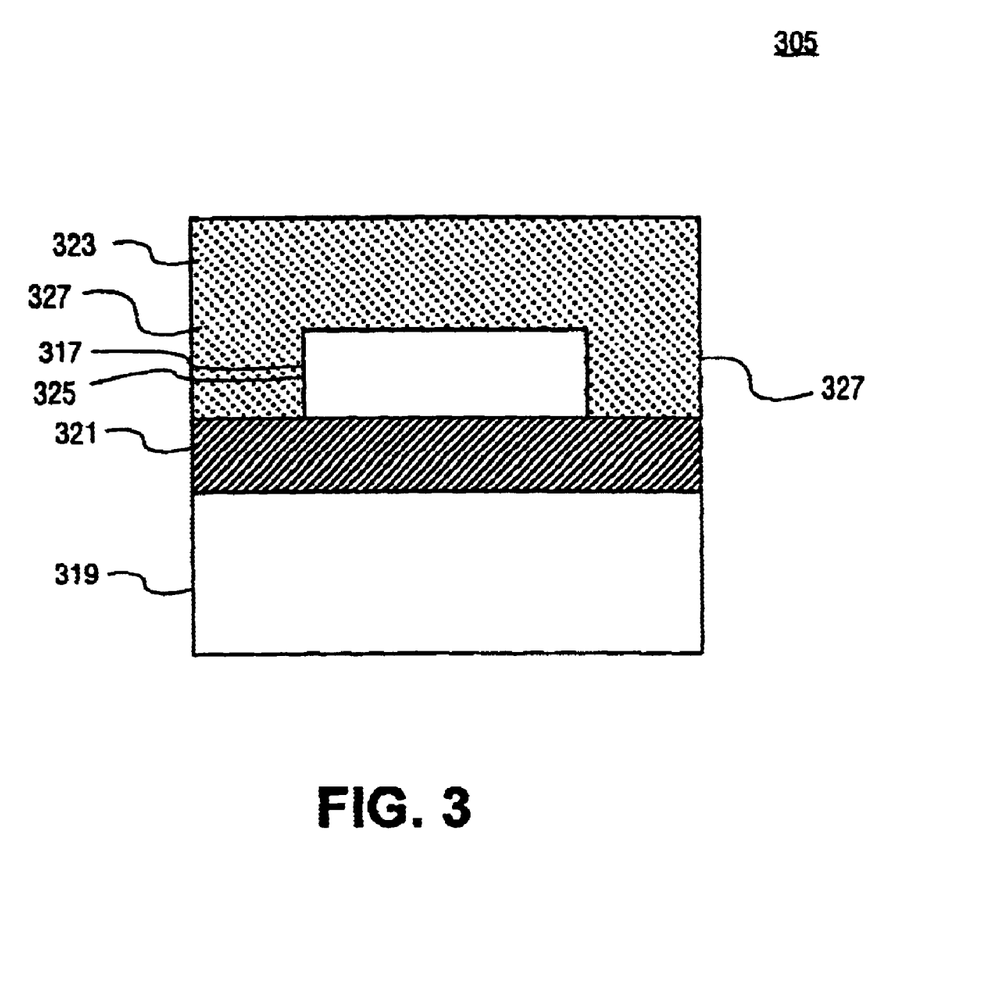
FIG. 3 is a cross-section diagram of one embodiment of a multi-mode interference (MMI) coupling device in accordance with the teachings of the present invention.

FIG. 3 is a cross-section diagram of one embodiment of an MMI coupling 305 device in accordance with the teachings of the present invention. In one embodiment, MMI coupling device 305 is disposed in a semiconductor substrate 305. In one embodiment, a semiconductor waveguide 325 is defined in semiconductor substrate 305 between lateral insulating regions 327 and between a buried insulating layer 321 and insulating region 323 of a silicon on insulator (SOI) wafer. Buried insulating layer 321 is disposed between semiconductor substrate 317 and semiconductor substrate 319 of the SOI wafer. In one embodiment, insulating region 323 includes an interlayer dielectric layer of the SOI wafer. In one embodiment, insulating regions 323, 327 and buried insulating layer 321 include an oxide material or the like, which form cladding for waveguide 317. The cladding provided by insulating regions 323, 327 and buried insulating layer 321 confine an optical beam propagating through waveguide 325 to remain within waveguide 325 as a result of total internal reflection since oxide has a smaller index of refraction than the semiconductor material of waveguide 325.

Figure 4:
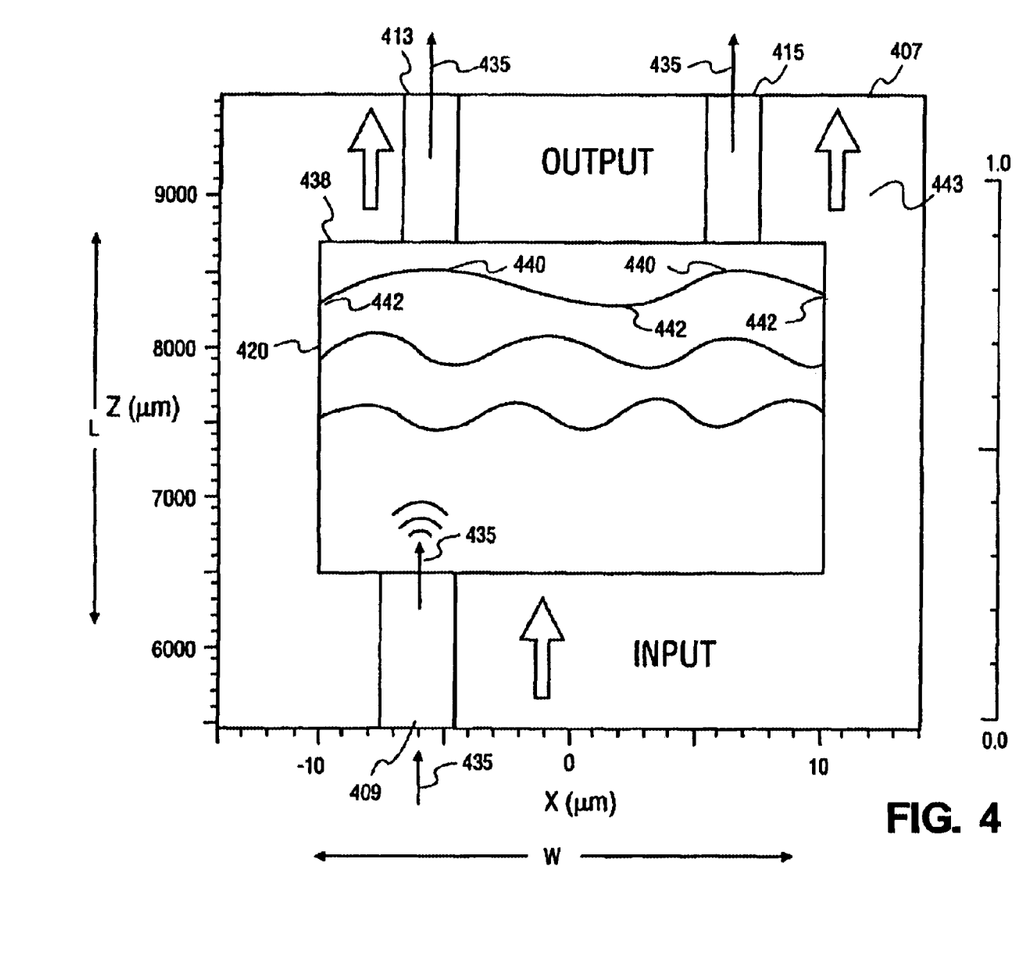
FIG. 4 is an illustration operation of one embodiment of an MMI coupling device in accordance with the teachings of the present invention.

FIG. 4 is an illustration operation of one embodiment of a portion of an MMI coupling device 407 in accordance with the teachings of the present invention. In one embodiment MMI coupling device 407 may be used in place of MMI coupling device 105 or optical splitter 103 in accordance with the teachings of the present invention. As shown, MMI device 407 includes a waveguide 438 disposed in a semiconductor substrate 443. In one embodiment, an optical beam 435 is directed into waveguide 438 through an input 409; In one embodiment, optical beam 435 is confined to remain within waveguide 438 with cladding 420 until exiting. As shown, the cladding 420 enclosing waveguide 438 in one embodiment has a length L and a width W and is designed to support a large number of modes in waveguide 438. In one embodiment, there are two outputs from waveguide 438 shown as waveguides outputs 413 and 415.

As illustrated in FIG. 4, optical beam 435 propagates from input 409 into waveguide 438 and is eventually deflected from the cladding 420 enclosing waveguide 438. The deflected wavefronts of optical beam 435 interfere with each other within waveguide 438 of MMI coupling device 407 such that maximas 440 and minimas 442 are created as shown. In one embodiment, L and W are designed such that there is a maxima 440 located at each output location corresponding to the outputs 413 and 415. Thus, the two outputs 413 and 415 of MMI coupling device 407 are optically coupled to the input 409 of coupling MMI device 407. In one embodiment, split optical beams 435 output from outputs 413 and 415 have substantially equal amplitude and almost π/2 phase shift Accordingly, MMI coupling device 407 functions as a 3 dB beam splitter and splits optical beam 435 into two beams with substantially equal amplitude.

It is appreciated that MMI device 407 has been illustrated for clarity including one input 409. However, it is appreciated that another input (not shown) is included and that an optical beam input to the second input is also split and output at outputs 413 and 415 as described above. In addition, it is appreciated that the direction of propagation of the optical beams may be reversed in accordance with the teachings of the present invention.

Figure 5:
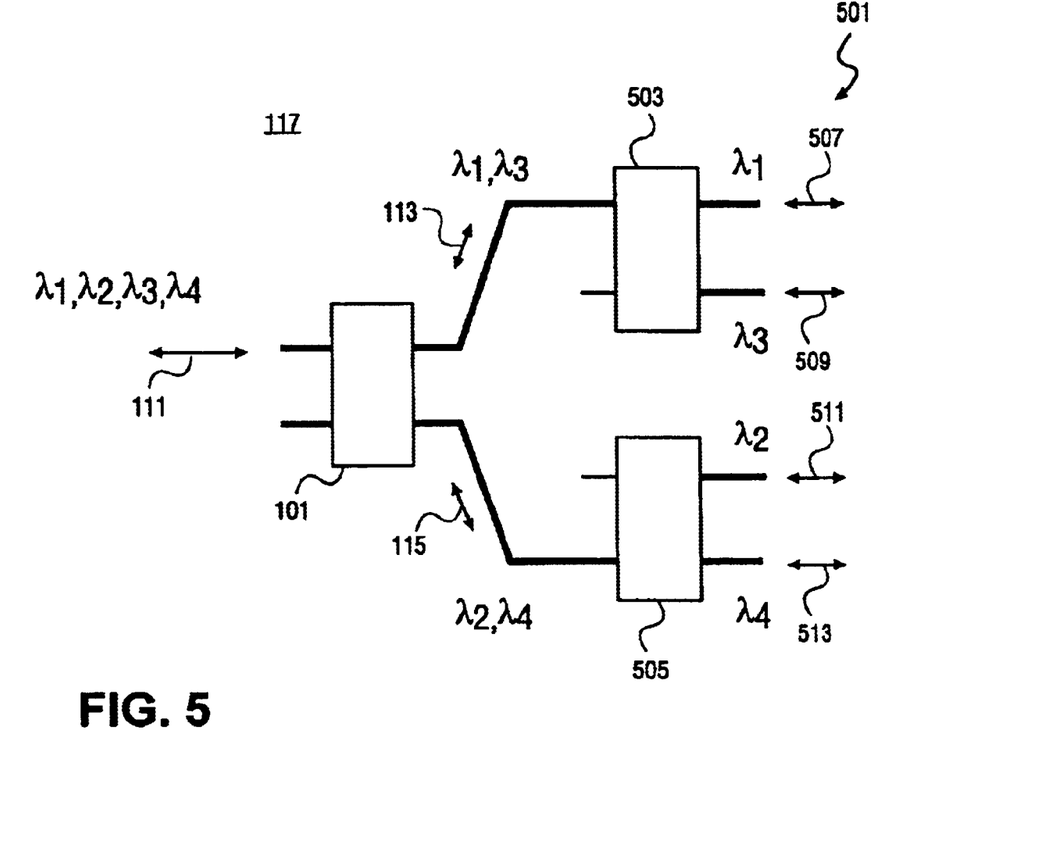
FIG. 5 is a block diagram illustrating one embodiment of cascaded or stacked optical interleavers in accordance with the teachings of the present invention.

FIG. 5 is a block diagram illustrating one embodiment of stacked or cascaded optical interleavers 501 in accordance with the teachings of the present invention. As shown in the depicted embodiment, optical interleavers 101, 503 and 505 are disposed in semiconductor substrate 117. In one embodiment, optical interleavers 503 and 505 include substantially similar structures to those included in optical interleaver 101 and described above. As shown, a first output of optical interleaver 101 is optically coupled to an input of interleaver 503 and a second output of optical interleaver 101 is optically coupled to an input of interleaver 505.

In operation, an optical beam 111 is optically coupled to be received at an input of optical interleaver 101. In one embodiment, optical beam 111 is a multi-channel optical beam carrying a plurality of channels, each of which having different wavelengths such as for example $\lambda_1, \lambda_2, \lambda_3$ and $\lambda_4$. In one embodiment, the multiple wavelengths included in optical beam 111 correspond to substantially equal frequency-spaced signals. As shown in the depicted embodiment, double frequency-spaced optical beams 113 and 115 are output from the two outputs of optical interleaver 101. Accordingly, optical beams 113 and 115 have wavelength components of $\lambda_1, \lambda_3, \ldots \lambda_{n-1}$ and $\lambda_2, \lambda_4, \ldots \lambda_{n-1}$ respectively, as shown in FIG. 5. By cascading optical interleavers 503 and 505 to the outputs to the optical interleaver 101, optical beam 111 is further demultiplexed such that the two outputs of optical interleaver 503 have single channel wavelength components $\lambda_1$ and $\lambda_3$, respectively, and the two outputs of optical interleaver 505 have single channel wavelength components $\lambda_2$ and $\lambda_4$, respectively.

Thus, the embodiment illustrated in FIG. 5 shows a 4 channel multiplexor/demultiplexor employing 3 cascaded interleavers 101, 503 and 505 in accordance with the teachings of the present invention. It is appreciated that additional channels may be multiplexed and/or demultiplexed by cascading additional interleavers in accordance with the teachings of the present invention.

Figure 6:
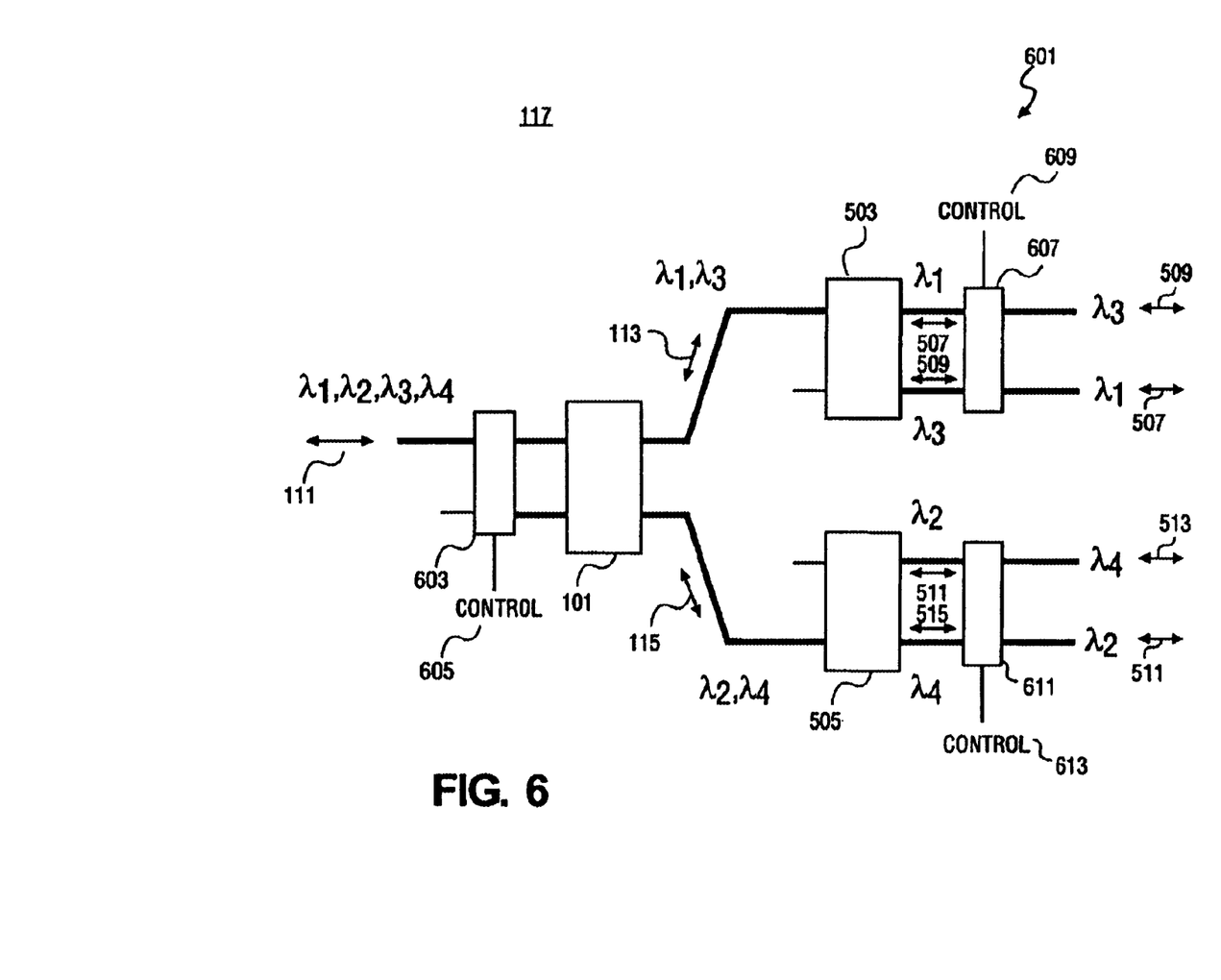
FIG. 6 is a block diagram illustrating another one embodiment of cascaded or stacked optical interleavers including switching capability in accordance with the teachings of the present invention.

FIG. 6 is a block diagram illustrating another one embodiment of cascaded or stacked optical interleavers 601 including switching capability in accordance with the teachings of the present invention. As shown in the illustrated embodiment, cascaded optical interleavers 601 is similar to cascaded optical interleavers 501 as the two outputs of optical interleaver 101 are optically coupled to inputs of optical interleavers 503 and 505.

As shown in the embodiment depicted in FIG. 6, optical switches 603, 607 and 611 disposed in semiconductor substrate 117 are optically coupled to optical interleavers 101, 503 and 505, respectively. In one embodiment, optical switches 603, 607 and 611 are 2×2 optical switches having two inputs and two outputs each. In one embodiment, each of the two outputs of optical switches 603, 607 and 611 are selectively optically coupled to either of the two inputs of optical switches 603, 607 and 611 in response to a control signals 605, 609 and 613, respectively.

In operation, multi-channel optical beam 111 having wavelengths such as for example $\lambda_1$, $\lambda_2$, $\lambda_3$ and $\lambda_4$ is received by interleaver 101. Optical beam 113 having wavelengths $\lambda_1$ and $\lambda_3$ is selectively output at either one of the two outputs of optical interleaver 101 and optical beam 115 having wavelengths $\lambda_2$ and $\lambda_4$ is selectively output at either one of the two outputs of optical interleaver 101. Accordingly, optical interleaver 503 is selectively optically coupled to receive optical beam 113 or 115 from optical interleaver 101 in response to control signal 605. Similarly, optical interleaver 505 is also selectively coupled to receive optical beam 113 or 115 from optical interleaver 101 in response to control signal 605.

Assuming optical interleaver 503 is optically coupled to receive optical beam 113, optical beam 507 having wavelength $\lambda_1$ is output at one of the two outputs of optical interleaver 503 and optical beam 509 having wavelength $\lambda_3$ is output at the other output of optical interleaver 503. Using optical switch 607, optical beams 507 and 509 can be selectively optically coupled between two different output parts in accordance with the teachings of the present invention.

Assuming optical interleaver 503 is optically coupled to receive optical beam 113, optical beam 507 having wavelength $\lambda_1$ is output at one of the two outputs of optical interleaver 503 and optical beam 509 having wavelength $\lambda_3$ is output at the other output of optical interleaver 503. Using optical switch 607, optical beans 507 and 509 can be selectively optically coupled between two different output ports in response to control signal 609 in accordance with the teachings of the present invention. Thus, in the example embodiment illustrated in FIG. 6, optical beam 509 including wavelength $\lambda_3$ is output at a first one of the outputs of optical switch 607 and optical beam 507 including wavelength $\lambda_1$ is output at a second one of the outputs of optical switch 607 in response to control signal 607. It is appreciated that control signal 607 can be used to switch the outputs of optical switch 607 such that optical beam 509 is output at the second one of the outputs of optical switch 607 and optical beam 507 is output at the first one of the outputs of optical switch 607.

Assuming optical interleaver 505 is optically coupled to receive optical beam 115, optical beam 511 having wavelength $\lambda_2$ is output at one of the two outputs of optical interleaver 505 and optical beam 513 having wavelength $\lambda_4$ is output at the other output of optical interleaver 505. Using optical switch 611, optical beams 511 and 513 can be selectively optically coupled between two different output ports in response to control signal 613 in accordance with the teachings of the present invention. Thus, in the example embodiment illustrated in FIG. 6, optical beam 513 including wavelength $\lambda_4$ is output at a first one of the outputs of optical switch 611 and optical beam 511 including wavelength $\lambda_2$ is output at a second one of the outputs of optical switch 611 in response to control signal 613. It is appreciated that control signal 613 can be used to switch the outputs of optical switch 611 such that optical beam 513 is output at the second one of the outputs of optical switch 611 and optical beam 511 is output at the first one of the outputs of optical switch 611.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures accordingly to be regarded as illustrative rather than restrictive.

What is claimed is:

1. An apparatus, comprising:
   first, second and third optical interleavers, each of the first, second and third interleavers including:
      first and second multi-mode interference (MMI) coupling devices disposed in a semiconductor substrate, each of the first and second MMI coupling devices of each of the first, second and third optical interleavers including first and second inputs and first and second outputs;
      a first optical coupler having a first optical path length, the first output of the first MMI coupling device optically coupled to the first input of the second MMI coupling device through the first optical coupler, and
      a second optical coupler having a second optical path length, the second output of the first MMI coupling device optically coupled to the second input of the second MMI coupling device through the second optical coupler, wherein the first optical path length is different than the second optical path length,
   wherein the first output of the second MMI coupling device of the first optical interleaver is optically coupled to the first input of the first MMI coupling device of the second optical interleaver,
   wherein the second output of the second MMI coupling device of the first optical interleaver is optically coupled to the second input of the first MMI coupling device of the third optical interleaver.

2. The apparatus of claim 1 wherein the first input of the first MMI coupling device of the first optical interleaver is optically coupled to receive an optical beam having a plurality of channels, each one of the plurality of channels having a corresponding wavelength,
   wherein the first output of the second MMI coupling device of the second interleaver is optically coupled to output a first one of the plurality of channels of the optical beam, wherein the second output of the second MMI coupling device of the second interleaver is optically coupled to output a second one of the plurality of channels of the optical beam, wherein the first output of the second MMI coupling device of the third interleaver is optically coupled to output a third one of the plurality of channels of the optical beam, wherein the second output of the second MMI coupling device of the third interleaver is optically coupled to output a fourth one of the plurality of channels of the optical beam.

3. The apparatus of claim 1 wherein the first input of the first MMI coupling device of the first optical interleaver is optically coupled to receive an optical beam having a plurality of channels, each one of the plurality of channels having a corresponding wavelength, wherein the first output of the second MMI coupling device of the second interleaver is optically coupled to output a first subset of the plurality of channels of the optical beam, wherein the second output of the second MMI coupling device of the second interleaver is optically coupled to output a second subset of the plurality of channels of the optical beam, wherein the first output of the second MMI coupling device of the third interleaver is optically coupled to output a third subset of the plurality of channels of the optical beam, wherein the second output of the second MMI coupling device of the third interleaver is optically coupled to output a fourth subset of the plurality of channels of the optical beam.

4. The apparatus of claim 1 wherein the first output of the second MMI coupling device of the second interleaver is optically coupled to receive a first optical beam having a first wavelength, wherein the second output of the second MMI coupling device of the second interleaver is optically coupled to receive a second optical beam having a second wavelength, wherein the first output of the second MMI coupling device of the third interleaver is optically coupled to receive a third optical beam having a third wavelength, wherein the second output of the second MMI coupling device of the third interleaver is optically coupled to receive a fourth optical beam having a fourth wavelength, wherein the fist input of the first MMI coupling device of the first optical interleaver is optically coupled to output a multi-channel optical beam including the first, second, third and fourth wavelengths combined.

5. The apparatus of claim 1 further comprising:

a first optical switch having first and second inputs and first and second outputs, the first and second outputs of the first optical switch optically coupled to the first and second inputs, respectively, of the first MMI coupling device of the first optical interleaver;

a second optical switch having first and second inputs and first and second outputs, the first and second inputs of the second optical switch optically coupled to the first and second outputs, respectively, of the second MMI coupling device of the second optical interleaver; and a third optical switch having first and second inputs and first and second outputs, the first and second inputs of the third optical switch optically coupled to the first and second outputs, respectively, of the second MMI coupling device of the third optical interleaver.

* * * * *

UNITED STATES PATENT AND TRADEMARK OFFICE
CERTIFICATE OF CORRECTION

PATENT NO. : 6,788,837 B2
DATED : September 7, 2004
INVENTOR(S) : Liu et al.

It is certified that error appears in the above-identified patent and that said Letters Patent is hereby corrected as shown below:

Column 6,
Line 28, after "shift" insert -- . --.

Column 7,
Line 5, delete "casaded" and insert -- cascaded --.
Line 49, delete "parts" and insert -- ports --.
Line 56, delete "beans" and insert -- beams --.

Column 8,
Line 28, after "figures" insert -- are --.

Column 10,
Line 14, delete "fist" and insert -- first --.

Signed and Sealed this

Twenty-seventh Day of September, 2005

JON W. DUDAS
*Director of the United States Patent and Trademark Office*